(12) United States Patent
Fiorani et al.

(10) Patent No.: US 10,805,856 B2
(45) Date of Patent: Oct. 13, 2020

(54) METHODS AND UNITS IN A NETWORK NODE FOR HANDLING COMMUNICATION WITH A WIRELESS DEVICE

(71) Applicant: Telefonaktiebolaget LM Ericsson (publ), Stockholm (SE)

(72) Inventors: Matteo Fiorani, Solna (SE); Angelo Centonza, Stockholm (SE); Gunnar Mildh, Sollentuna (SE); Ioanna Pappa, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/333,907

(22) PCT Filed: Sep. 21, 2018

(86) PCT No.: PCT/SE2018/050962
§ 371 (c)(1),
(2) Date: Mar. 15, 2019

(87) PCT Pub. No.: WO2019/059836
PCT Pub. Date: Mar. 28, 2019

(65) Prior Publication Data
US 2020/0120572 A1    Apr. 16, 2020

Related U.S. Application Data

(60) Provisional application No. 62/561,709, filed on Sep. 22, 2017.

(51) Int. Cl.
*H04W 36/38* (2009.01)
*H04W 36/00* (2009.01)
(Continued)

(52) U.S. Cl.
CPC ....... *H04W 36/38* (2013.01); *H04W 36/0069* (2018.08); *H04W 36/06* (2013.01);
(Continued)

(58) Field of Classification Search
CPC ......... H04W 4/70; H04W 8/08; H04W 28/00; H04W 36/0069; H04W 72/0413;
(Continued)

(56) References Cited

U.S. PATENT DOCUMENTS

2013/0303114 A1\*  11/2013  Ahmad ................. H04W 16/14
                                                                          455/406
2015/0264601 A1    9/2015  Cha
(Continued)

FOREIGN PATENT DOCUMENTS

| EP | 2498570 A1 | 9/2012 |
|---|---|---|
| WO | 2017052266 A1 | 3/2017 |
| WO | 2017155299 A2 | 9/2017 |

OTHER PUBLICATIONS

3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V1.0.0, Sep. 2017, 1-44.
(Continued)

*Primary Examiner* — Jean A Gelin
(74) *Attorney, Agent, or Firm* — Murphy, Bilak & Homiller, PLLC

(57) ABSTRACT

A central unit (300A) and a first distributed unit (300B) of a first network node (300) and methods therein, for handling a communication with a wireless device (302) in a wireless network. The central unit (300A) sends an indication to the first distributed unit (300B) to indicate whether a current procedure for the wireless device is an inter-central unit procedure or an intra-central unit procedure. The first dis-
(Continued)

tributed unit (300B) is thereby able to decide whether to send information about the communication to the central unit via a user plane or via a control plane, based on a reduced amount of signalling including the indication.

5 Claims, 12 Drawing Sheets

(51) Int. Cl.
*H04W 36/06* (2009.01)
*H04W 36/08* (2009.01)
*H04W 88/08* (2009.01)
*H04W 92/04* (2009.01)

(52) U.S. Cl.
CPC .......... *H04W 36/08* (2013.01); *H04W 88/085* (2013.01); *H04W 92/04* (2013.01)

(58) Field of Classification Search
CPC . H04W 74/0833; H04W 76/15; H04W 76/20; H04W 36/0022; H04W 76/10; H04W 76/11; H04W 76/14; H04W 76/18; H04W 76/27; H04W 92/02; H04W 92/20; H04W 76/16; H04W 76/30
See application file for complete search history.

(56) References Cited

U.S. PATENT DOCUMENTS

2018/0323842 A1* 11/2018 Majmundar ...... H04W 36/0011
2019/0174561 A1*  6/2019 Sivavakeesar ........ H04W 76/10
2019/0281517 A1*  9/2019 Oak .................. H04W 36/0055
2019/0380172 A1* 12/2019 Xu ......................... H04W 92/20

OTHER PUBLICATIONS

3GPP, "3rd Generation Partnership Project; Technical Specification Group Radio Access Network; NG-RAN; Architecture description (Release 15)", 3GPP TS 38.401 V0.2.0, Jul. 2017, 1-20.

3GPP, "3rd Generation Partnership Project; Technical Specification Group Radio Access Network; NR; NR and NG-RAN Overall Description; Stage 2 (Release 15)", 3GPP TS 38.300 V1.0.0, Sep. 2017, 1-59.

3GPP, "3rd Generation Partnership Project; Technical Specification Group Services and System Aspects; 3GPP System Architecture Evolution (SAE); Security architecture (Release 15)", 3GPP TS 33.401 V15.0.0, Jun. 2017, 1-153.

3GPP, "3rd Generation Partnership Project; Technical Specification Group Services and System Aspects; System Architecture for the 5G System; Stage 2 (Release 15)", 3GPP TS 23.501 V1.3.0, Sep. 2017, 1-174.

* cited by examiner

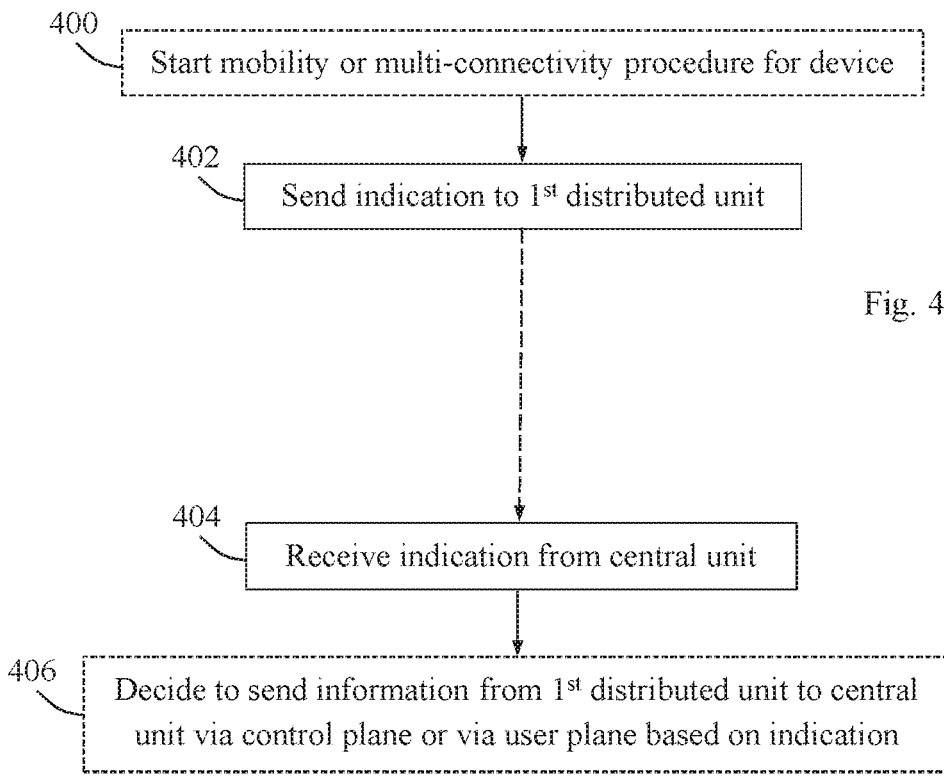
Fig. 4A
Fig. 4B
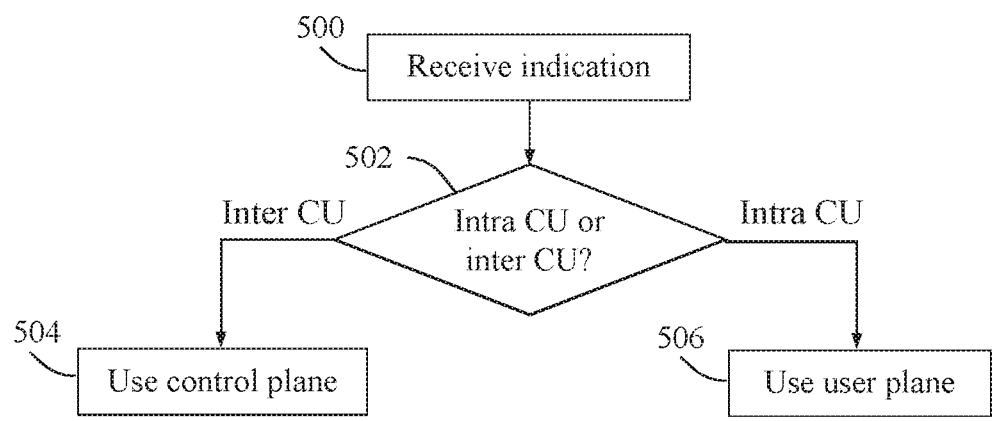
Fig. 5

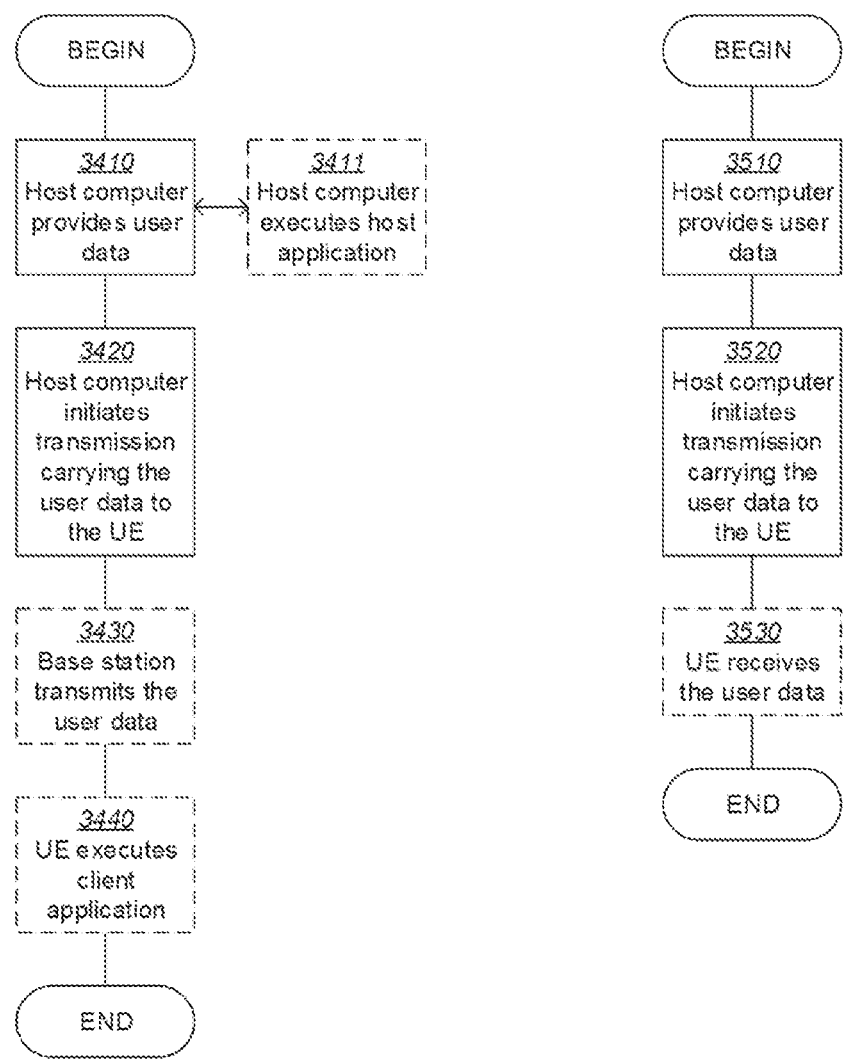

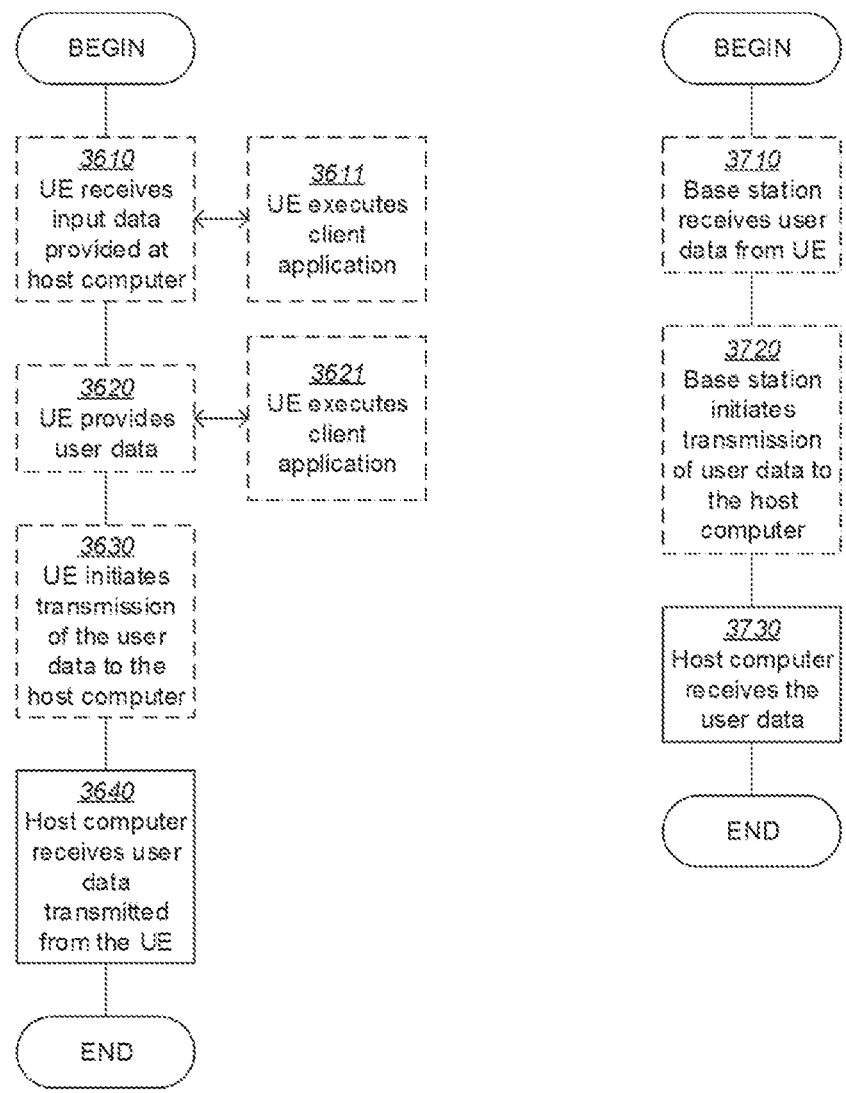

METHODS AND UNITS IN A NETWORK NODE FOR HANDLING COMMUNICATION WITH A WIRELESS DEVICE

TECHNICAL FIELD

The present disclosure relates generally to a central unit and a first distributed unit of a first network node and methods therein, for handling a communication with a wireless device in a wireless network. The first network node thus comprises the central unit which is connected to a core part of the wireless network, and at least the first distributed unit which is used for radio communication with the wireless device.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device.

Further, the term "network node", is used herein to represent any node of a wireless network that is operative to communicates radio signals with wireless devices. Depending on the type of network, the network node in this disclosure may refer to a base station, radio node, Node B, eNB, gNB, access point, etc., although this disclosure is not limited to any of these examples. Some further terms used frequently in this disclosure include: RAN denoting a Radio Access network, NR denoting New Radio, NG denoting Next Generation, and gNB denoting a Next Generation NodeB. These terms are commonly used for describing procedures and systems in 5G as defined by the third Generation Partnership Project, 3GPP. The network node in this disclosure may also refer to a node in the wireless network, such as a Radio Network Controller, RNC, that controls one or more base stations or radio nodes that communicate radio signals with wireless devices. The term "gNB" is used herein to represent such a base station or radio node.

The current 5G RAN architecture is described in the 3GPP document TS 38.401 v0.1.0 and a schematic illustration of this architecture is presented in FIG. 1. This figure shows two example network nodes denoted gNB, of an NG-RAN and each gNB comprises a central unit denoted gNB-CU which is connected to a core part of a wireless network, denoted 5GC, and a number of distributed units denoted gNB-DU which are used for radio communication with wireless devices, not shown.

In the field of wireless communication, the term "core part" is frequently used as a synonym for core network, and wireless networks typically comprise a RAN, or "radio part", which handles radio communication with wireless devices and a Core Network CN, i.e. the core part, which basically controls and supervises the radio access network. Here, two gNB-DUs are shown in each gNB as an example, although a gNB may basically comprise any number of gNB-DUs including only one gNB-DU. A RAN may further comprise any number of gNBs while only two are shown here for simplicity.

The NG architecture shown in FIG. 1 can be further described as follows:
  The NG-RAN comprises a set of gNBs connected to the 5GC through the NG interface.
  An gNB can support Frequency Division Duplex FDD mode, Time Division Duplex TDD mode or dual mode operation of both FDD and TDD modes.
  gNBs can be interconnected through the Xn interface.
  A gNB may comprise a gNB-CU and a number of gNB-DUs. A gNB-CU and a gNB-DU can be interconnected via the F1 logical interface.
  One gNB-DU is typically connected to only one gNB-CU while a gNB-DU may be connected to any number of gNB-CUs.
  NOTE: For resiliency, a gNB-DU may be connected to multiple gNB-CUs by appropriate implementation.

The above-mentioned interfaces NG, Xn and F1 are logical interfaces. The NG-RAN is layered to comprise a Radio Network Layer (RNL) and a Transport Network Layer (TNL). The NG-RAN architecture, i.e. comprised of the NG-RAN logical nodes and interfaces between these nodes, is defined as part of the RNL. For each NG-RAN interface (NG, Xn, F1) the related TNL protocol and functionalities are specified. The TNL provides services for user plane transport, as well as signalling transport. In a so-called NG-Flex configuration, each gNB can be connected to all 5GC nodes within a pool area. A pool area in this context is defined in 3GPP TS 23.501. If security protection is required or desired for control plane and user plane data on TNL of NG-RAN interfaces, IP Network Domain Security, NDS/IP, as described in 3GPP TS 33.401 may be applied.

In the context of RAN 5G architectures, 3GPP has agreed that dual connectivity shall be supported. Such dual connectivity includes establishing master and secondary nodes and distributing user plane (UP) traffic to the master node (MN) and secondary nodes (SNs) according to the best possible traffic and radio resource management. Control plane (CP) traffic is assumed to terminate in one node only, i.e. the MN. FIGS. 2A and 2B show the protocol and interfaces involved in dual connectivity, in accordance with the 3GPP document TS 38.300 v0.6.0.

FIG. 2A shows that a master node denoted Master gNB (MgNB) is able to forward Packet Data Convergence Protocol (PDCP) bearer traffic to a secondary node denoted Secondary gNB (SgNB), while FIG. 2B shows the case where the SgNB forwards PDCP bearer traffic to the MgNB over the Xn interface. In some cases it could be considered that the MgNB and SgNB may be subject to the RAN split architecture outlined above involving various CUs and DUs.

Furthermore, in the context of 5G standardization, multi-RAT dual connectivity (MR-DC) is being specified, where multi-RAT denotes the use of multiple radio access technologies, RATs. When MR-DC is applied, a RAN node (the master node, MN) anchors the control plane towards the CN, while another RAN node (the secondary node, SN) provides control and user plane resources to the UE via coordination with the MN, see FIG. 2C which is extracted from the 3GPP document TS 37.340.

Within the scope of MR-DC, various user plane/bearer type solutions are possible, as seen in FIG. 2D which is also extracted from TS 37.340. This figure illustrates a Radio Protocol Architecture for MGC, MCG split, SCG and SCG split bearers in MR-DC with 5GC.

In the 3GPP document TS 38.401, some overall procedures are depicted, including signalling flows in a gNB-CU/gNB-DU architecture e.g. initial access from the UE, inter- DU mobility etc. In the mobility procedures, means to avoid data loss during handover are included.

However, it may happen that the central unit is changed for a wireless device during mobility or multi-connectivity procedures of an ongoing communication with a distributed unit. In this case, added control signalling is required to the distributed unit to provide a basis for deciding how to send information to the central unit about the communication, e.g. to indicate which packets have been successfully transmitted and/or which packets need to be re-transmitted. As a result, a handover procedure or a multi-connectivity procedure may be delayed by such added control signalling.

SUMMARY

It is an object of embodiments described herein to address at least some of the problems and issues outlined above. It is possible to achieve this object and others by using a central unit and a distributed unit of a first network node, and methods therein, as defined in the attached independent claims.

According to one aspect, a method is performed by a central unit of a first network node, for handling a communication with a wireless device in a wireless network, wherein the first network node comprises the central unit connected to a core part of the wireless network and at least a first distributed unit used for radio communication with the wireless device. In this method, the central unit sends an indication to the first distributed unit to indicate whether a current procedure for the wireless device is an inter-central unit procedure or an intra-central unit procedure, said current procedure being related to mobility or multi-connectivity of the wireless device.

According to another aspect, a central unit of a first network node is arranged to handle a communication with a wireless device in a wireless network, wherein the first network node comprises the central unit which can be connected to a core part of the wireless network and at least a first distributed unit which can be used for radio communication with the wireless device. The central unit is operable to send an indication to the first distributed unit to indicate whether a current procedure for the wireless device is an inter-central unit procedure or an intra-central unit procedure, said current procedure being related to mobility or multi-connectivity of the wireless device.

According to another aspect, a method is performed by a first distributed unit of a first network node for handling a communication with a wireless device in a wireless network, wherein the first network node comprises a central unit connected to a core part of the wireless network and at least the first distributed unit used for radio communication with the wireless device. In this method, the first distributed unit receives an indication from the central unit, the indication indicating whether a current procedure for the wireless device is an inter-central unit procedure or an intra-central unit procedure, said current procedure being related to mobility or multi-connectivity of the wireless device.

According to another aspect, a first distributed unit of a first network node is arranged to handle a communication with a wireless device in a wireless network, wherein the first network node comprises a central unit which can be connected to a core part of the wireless network and at least the first distributed unit which can be used for radio communication with the wireless device. The first distributed unit is operable to receive an indication from the central unit, the indication indicating whether a current procedure for the wireless device is an inter-central unit procedure or an intra-central unit procedure, said current procedure being related to mobility or multi-connectivity of the wireless device.

When using one or more of the above units and methods, it is an advantage that very little signalling is needed between the first distributed unit 300B and the central unit 300A, i.e. the above indication, for the first distributed unit to know which plane to use for sending information to the central unit about the communication, e.g. to indicate which packets have been successfully transmitted and/or which packets need to be re-transmitted. As a result, the current procedure will not be delayed by extensive signalling as in conventional solutions.

The above central unit, first distributed unit and methods may be configured and implemented according to different optional embodiments to accomplish further features and benefits, to be described below.

A computer program is also provided comprising instructions which, when executed on at least one processor in either of the above central unit and first distributed unit, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which:

FIG. 4A is a flow chart illustrating a procedure in a central unit of a network node, according to further possible embodiments.

FIG. 4B is a flow chart illustrating a procedure in a first distributed unit of the network node, according to further possible embodiments.

FIG. 5 is a flow chart illustrating an example of how a distributed unit of the network node may operate in more detail, according to further possible embodiments.

FIGS. 11-16 illustrate further scenarios, structures and procedures that may be employed when the solution is used, according to further possible embodiments.

DETAILED DESCRIPTION

In the following, the term "current procedure" will be used which refers to a current or ongoing procedure that is somehow related to mobility or multi-connectivity of the wireless device. A mobility procedure basically involves evaluation of which access point, i.e. network node and/or distributed unit, is best or good enough to use for wireless communication with a wireless device.

Depending on the above evaluation, the mobility procedure may also sometimes include a handover procedure if it is determined that the wireless device should be handed over from its serving source node to a new target node. A multi-connectivity procedure basically involves evaluation of two or more access points, including network nodes and/or distributed units, to be used simultaneously for wireless communication with a wireless device.

In the above-described split RAN architecture where a gNB comprises a central unit (gNB-CU) and a number of distributed units (gNB-DU), the mobility and the multi-connectivity procedures could be either an inter-central unit procedure or an intra-central unit procedure, referred to as inter or intra gNB-CU. An inter-central unit procedure implies that at least two central units are involved in the procedure such as handover of the wireless device from one network node to another network node, while an intra-central unit procedure implies that only one central unit is involved in the procedure such as handover of the wireless device from one distributed unit to another distributed unit within the same network node. The example of handover of a mobility procedure will be used as an example in the following description, although the solution is not limited to handovers.

Currently, the distributed unit, e.g. gNB-DU, is unaware of whether an ongoing or "current" procedure is an inter-central unit procedure or an intra-central unit procedure, such as inter or intra gNB-CU. This could lead to extra-signalling and sub-optimal performance, such that a longer time is required for completing a handover procedure or an SN/MN change procedure in dual-connectivity.

Figure 1:
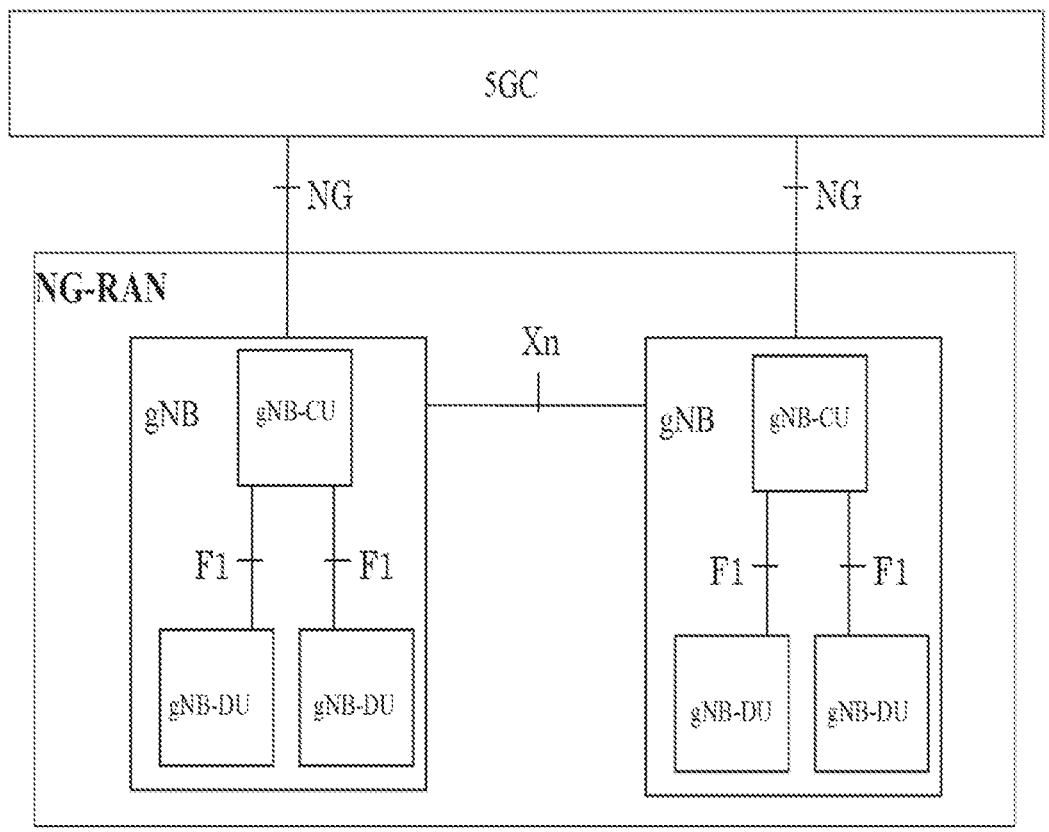
FIG. 1 is a schematic illustration of an overall 5G RAN architecture.
Figure 2A:
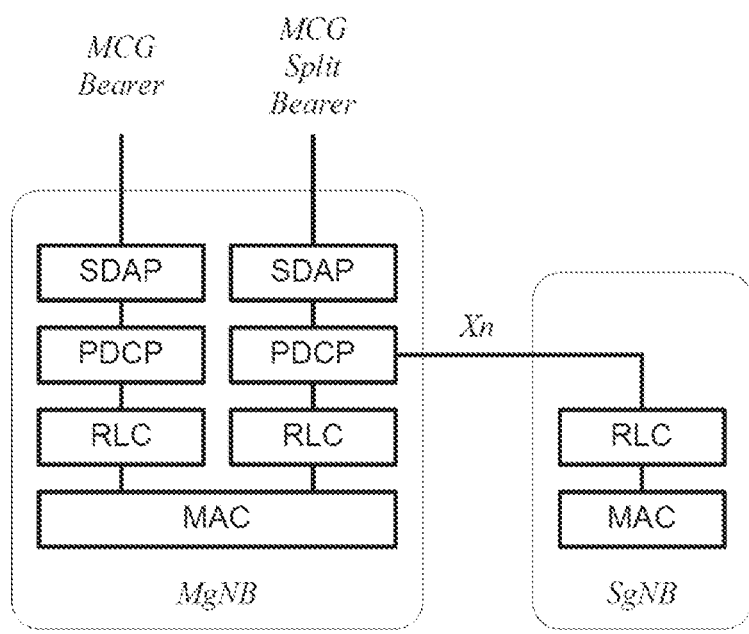
FIGS. 2A-2D illustrate communications involving a master node MgNB or MN, and a secondary node SgNB or SN.
Figure 2B:
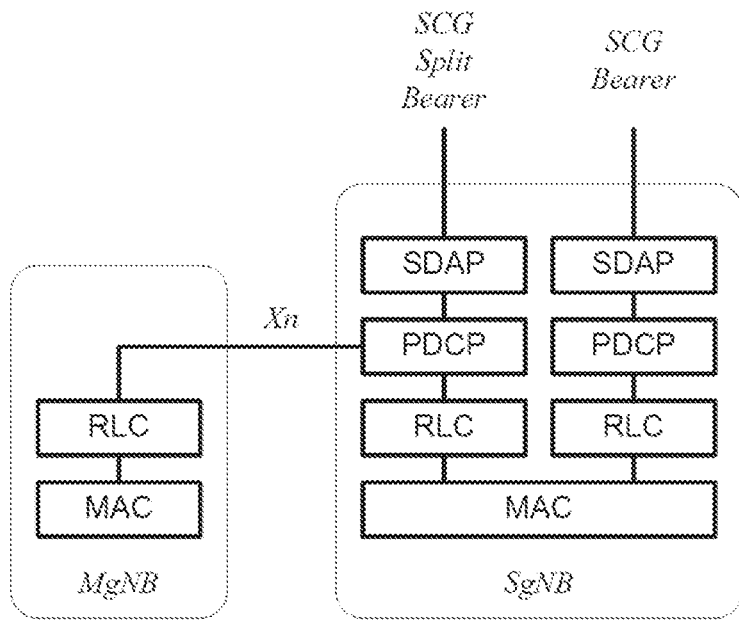
Figure 2C:
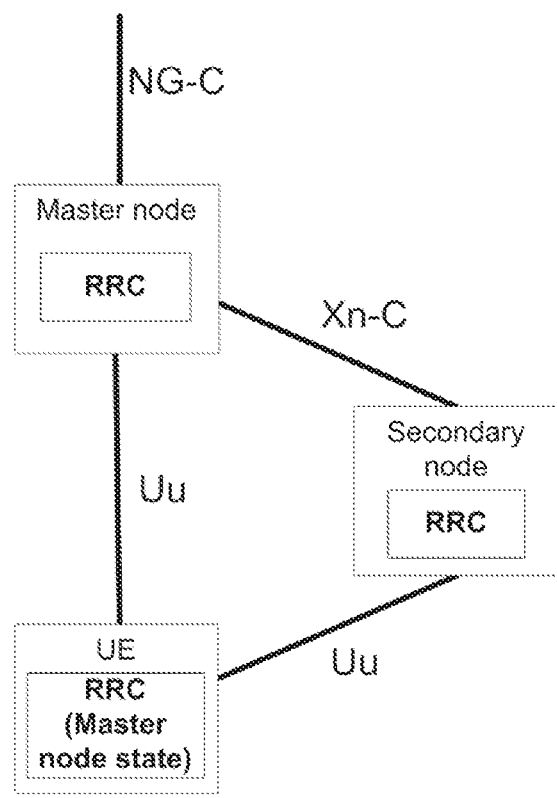
Figure 2D:
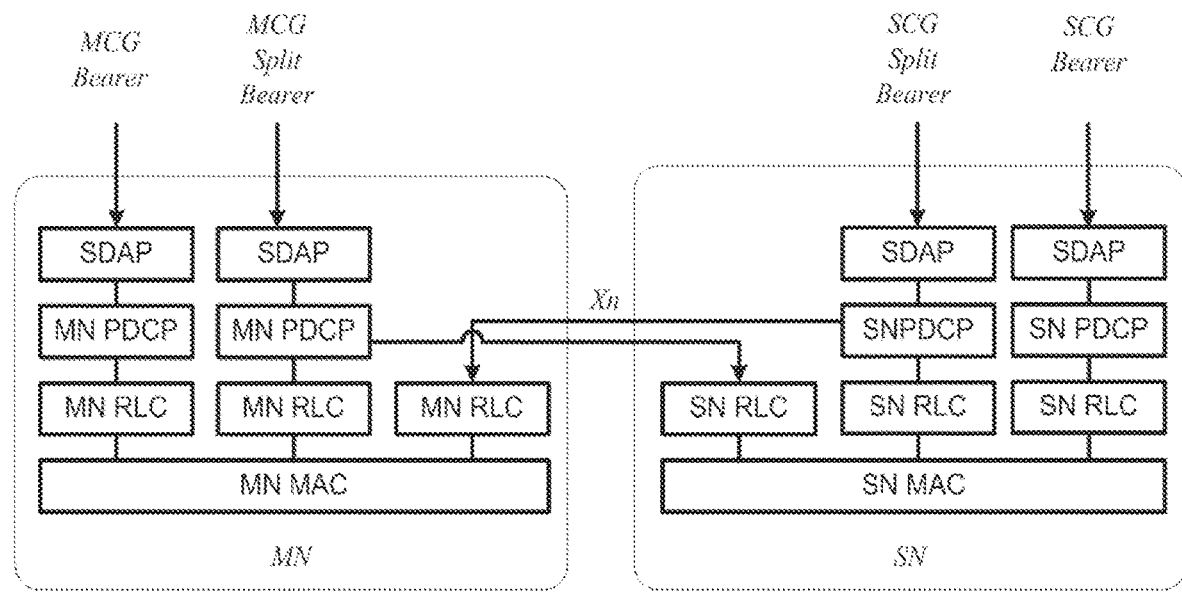
Figure 3:
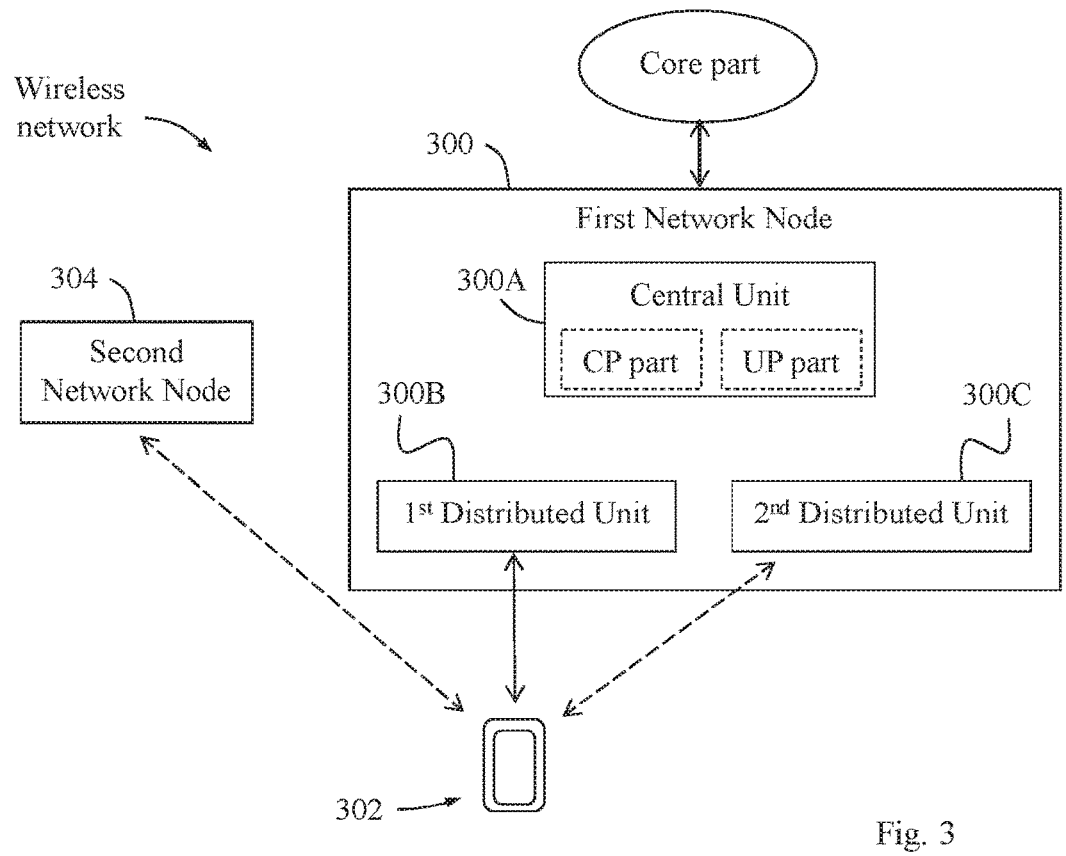
FIG. 3 illustrates how a wireless device may be connected to a first network node with two distributed units and a second network node of a wireless network, where the solution may be used.

The embodiments described herein may be used in a procedure for handling a communication with a wireless device in a wireless network, such as the wireless network illustrated in FIG. 3. A first network node 300 comprises a central unit 300A which is connected to a core part of the wireless network, and at least two distributed units 300B, 300C than can be used for radio communication with a wireless device 302. The first network node 300 thus corresponds to each gNB shown in FIG. 1. The central unit 300A comprises a control plane (CP) part and a user plane (UP) part, which may participate in communication with the distributed units 300B, 300C in accordance with some examples to be described below.

A method performed by the first network node 300 may be defined as follows, with reference to FIG. 3:

A method performed by a first network node 300 for handling a communication with a wireless device 302 in a wireless network, wherein the first network node comprises a central unit 300A connected to a core part of the wireless network and at least a first distributed unit 300B used for radio communication with the wireless device, the method comprising:
sending an indication from the central unit to the first distributed unit to indicate whether a current procedure for the wireless device 302 is an inter-central unit procedure or an intra-central unit procedure, said current procedure being related to mobility or multi-connectivity of the wireless device 302.

The terms inter-central unit procedure (involving multiple central units) and intra-central unit procedure (involving one central unit) have been explained above. Advantages that may be achieved by employing the embodiments herein include that the central unit 300A or gNB-CU is able to inform a distributed unit 300B or gNB-DU whether the gNB-CU would change or not, in cases of mobility and multi-connectivity, and that the gNB-DU is thereby able to decide to use control plane or user plane for sending information about the communication, e.g. to indicate which packets have been successfully transmitted and/or which packets need to be re-transmitted.

An example of how the solution may be employed in terms of actions performed by a central unit of a first network node, such as the central unit 300A and the first network node 300 shown in FIG. 3, is illustrated by the flow chart in FIG. 4A which will now be described with further reference to FIG. 3 as an illustrative but non-limiting example scenario. FIG. 4A thus illustrates a method in the central unit 300A for handling a communication with a wireless device 302 in a wireless network. The first network node comprises the central unit 300A connected to a core part of the wireless network and at least a first distributed unit 300B used for radio communication with the wireless device as indicated by a two-way arrow between 300B and 302.

A first action 400 illustrates that the central unit 300A may initially start a procedure related to mobility or multi-connectivity of the wireless device 302. In another action 402, the central unit 300A further sends an indication to the first distributed unit to indicate whether the current procedure for the wireless device 302 is an inter-central unit procedure or an intra-central unit procedure, said current procedure being related to mobility or multi-connectivity of the wireless device 302.

Some further embodiments and examples that may be employed in the above method of FIG. 4A will now be described.

In some example embodiments, the indication sent in action 402 may be sent in a message being any of: a UE Context Modification Request, a UE Context Release Command message, an F1 Downlink RRC Transfer message, a Bearer Modification request, a Bearer Release message, and an F1AP message which may be a newly defined F1AP message.

In further example embodiments, the indication sent in action 402 may comprise a binary flag in an Information Element, IE which could be a newly defined IE, or the binary flag may reside in an existing already defined IE.

Another example of how the solution may be employed in terms of actions performed by a first distributed unit of a first network node, such as the first distributed unit 300B and the first network node 300 shown in FIG. 3, is further illustrated by the flow chart in FIG. 4B which will now be described likewise with further reference to FIG. 3. FIG. 4B thus illustrates a method in the first distributed unit 300B for handling a communication with a wireless device 302 in a wireless network, wherein the first network node comprises a central unit 300A connected to a core part of the wireless network and at least the first distributed unit 300B used for radio communication with the wireless device. The methods in FIGS. 4A and 4B are complementary in the sense that the method in FIG. 4B is performed as a result of the method in FIG. 4A.

A first action 404, which thus follows action 402, illustrates that the first distributed unit 300B receives an indication from the central unit 300A, the indication indicating whether a current procedure for the wireless device 302 is an inter-central unit procedure or an intra-central unit procedure, said current procedure being related to mobility or multi-connectivity of the wireless device 302.

Another action 406 illustrates that he first distributed unit may further decide whether to send information about the communication with the wireless device to the central unit via a user plane or via a control plane based on the indication from the central unit.

Some further embodiments and examples that may be employed in the above method of FIG. 4B will now be described.

In some example embodiments, the indication received in action 404 may be received in a message being any of: a UE Context Modification Request, a UE Context Release Command message, an F1 Downlink RRC Transfer message, a Bearer Modification request, a Bearer Release message, and an F1AP message which may be a newly defined F1AP message. In further example embodiments, the indication may comprise a binary flag in an Information Element, IE which could be either a new IE or an already existing IE, as mentioned above.

In another example embodiment, the first distributed unit is able to decide whether to send information about the communication with the wireless device to the central unit via a user plane or via a control plane based on the indication from the central unit. This embodiment was illustrated in action 406 and an example of how this could be done in more detail will be described later below with reference to FIG. 5.

When the current procedure is related to mobility of the wireless device, another example embodiment may be that the first distributed unit decides to send information about its latest, i.e. most recent, transmitted data to the central unit via a user plane if the indication indicates an intra-central unit procedure and via a control plane if the indication indicates an inter-central unit procedure.

If the latter embodiment is employed, one of three further alternative embodiments may be employed as follows. One alternative embodiment may be that when the indication indicates an intra-central unit procedure, the first distributed unit sends a user plane message to the central unit with information about unsuccessfully transmitted data. This enables the central unit to send the unsuccessfully transmitted data to a target second distributed unit 300C belonging to the first network node for re-transmission to the wireless device.

Another alternative embodiment may be that when the indication indicates an intra-central unit procedure, the first distributed unit receives a forwarding instruction and forwards unsuccessfully transmitted data to a target second distributed unit 300C belonging to the first network node for re-transmission to the wireless device. In that case, the forwarding instruction may, in another embodiment, comprise an IP address of the target second distributed unit, port numbers and protocols to be used when forwarding the unsuccessfully transmitted data to the target second distributed unit.

Yet another alternative embodiment may be that when the indication indicates an inter-central unit procedure, the first distributed unit can send a control plane message to the central unit with information about successfully transmitted data. This enables the central unit to instruct a target second network node 304 to continue transmission of data to the wireless device. In that case, another example embodiment may be that the above control plane message is a UE Context Modification Response message containing said information. If this particular message is used, another example embodiment may be that the UE Context Modification Response message sent from the first distributed unit triggers the central unit to issue an XnAP SN Status Transfer message to the target second network node.

Figure 7:
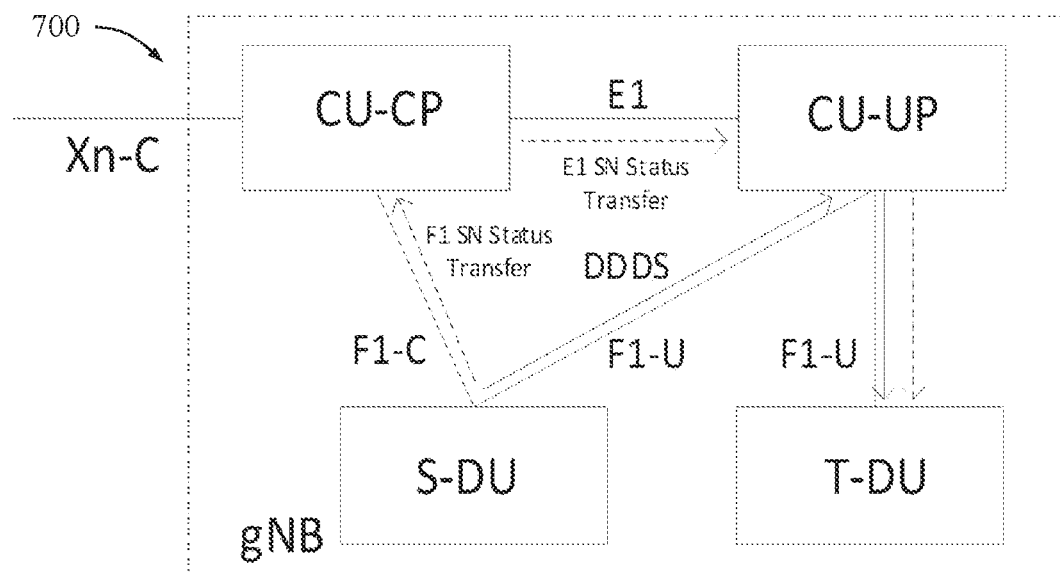
FIG. 7 is a block diagram illustrating how a central unit and two distributed units of a first network node may communicate when a UE (not shown) is handed over from a source distributed unit S-DU to a target distributed unit T-DU within the central unit, according to further possible embodiments.

It was mentioned above that some of the embodiments above are useful when the current procedure is related to mobility of the wireless device. Another example embodiment may be that when the current procedure is related to mobility of the wireless device and the indication indicates an intra-central unit procedure, the first distributed unit S-DU sends a control plane message to a control plane part CU-CP of the central unit with information about the latest and most recently transmitted data. Thereby, the control plane part of the central unit can forward said information to a user plane part CU-UP of the central unit to enable the user plane part of the central unit to send any unsuccessfully transmitted data to a target second distributed unit T-DU belonging to the first network node for re-transmission to the wireless device. An example of how this embodiment could be used when the indication indicates an intra-central unit procedure, is illustrated in FIG. 7 where the above abbreviations CU-CP, CU-UP, S-DU and T-DU are used, to be described later below.

Figure 8:
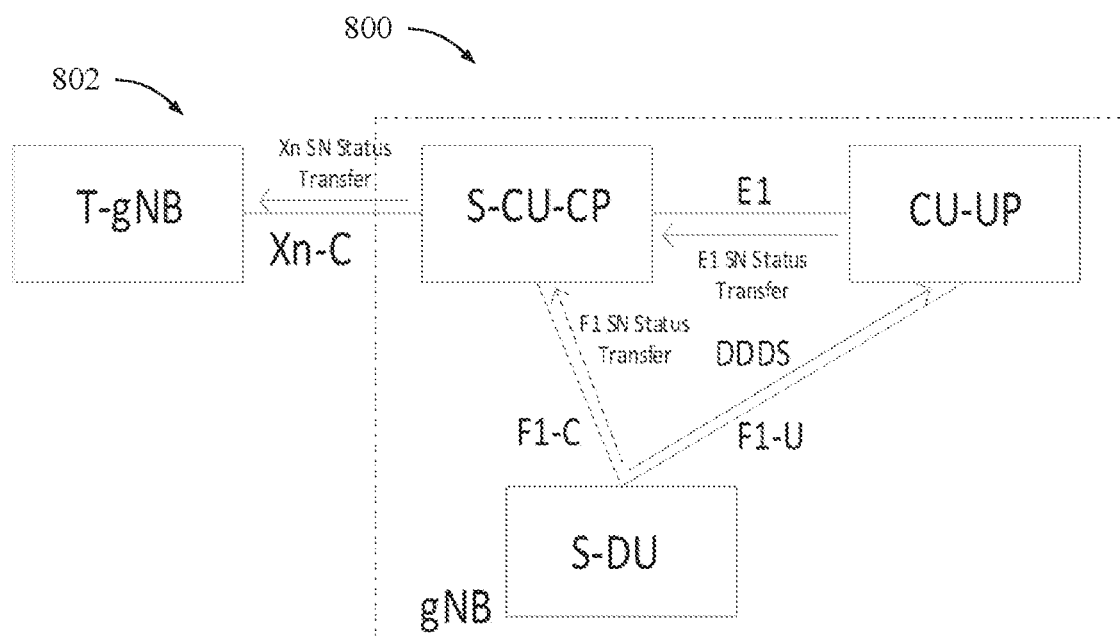
FIG. 8 is a block diagram illustrating how a central unit and a distributed unit of a first network node may communicate when a UE (not shown) is handed over from a source distributed unit S-DU to a second network node, according to further possible embodiments.

Yet another example embodiment may be that when the current procedure is related to mobility of the wireless device and the indication indicates an inter-central unit procedure, the first distributed unit S-DU sends a user plane message to a user plane part CU-UP of the central unit with information about latest and most recently transmitted data. Thereby, the user plane part of the central unit can forward said information to a control plane part S-CU-CP of the central unit to enable the control plane part of the central unit to instruct a target second network node T-gNB to continue transmission of data to the wireless device. An example of how this embodiment could be used when the indication indicates an inter-central unit procedure, is illustrated in FIG. 8 where the above abbreviations S-CU-CP, S-DU and CU-UP are used, also to be described later below.

It was mentioned above that the first distributed unit 300B may decide in action 406 whether to send information about the communication with the wireless device to the central unit 300A via a user plane or via a control plane based on the indication received from the central unit in action 404. FIG. 5 illustrates another example of how the first distributed unit 300B may operate to realize this embodiment.

In a first action 500, the first distributed unit 300B receives or obtains the above-described indication from the central unit 300A, corresponding to action 404. In a next action 602, the first distributed unit 300B determines whether the received or obtained indication indicates whether a current procedure for the wireless device is an inter-central unit procedure or an intra-central unit procedure. The indication may be very short such as a single bit or binary flag (1 or 0) in a new or existing Information Element, IE, which the first distributed unit 300B is able to recognize. For example, 1 may indicate an inter-central unit procedure and 0 may indicate an intra-central unit procedure, or vice versa.

If it is established in action 502 that the indication indicates that the current procedure is an inter-central unit procedure "inter CU", the first distributed unit 300B decides to use the control plane in an action 504 for sending information about the communication to the central unit 300A. Alternatively, if it is established in action 502 that the indication indicates that the current procedure is an intra-central unit procedure "intra CU", the first distributed unit 300B decides to use the user plane in an action 506 for sending information about the communication to the central unit 300A. Thereby, the first distributed unit 300B will know which plane to use for sending the information from a minimum of signalling between the first distributed unit 300B and the central unit 300A, i.e. the above indication, and the current procedure will not be delayed as in conventional solutions.

Figure 6:
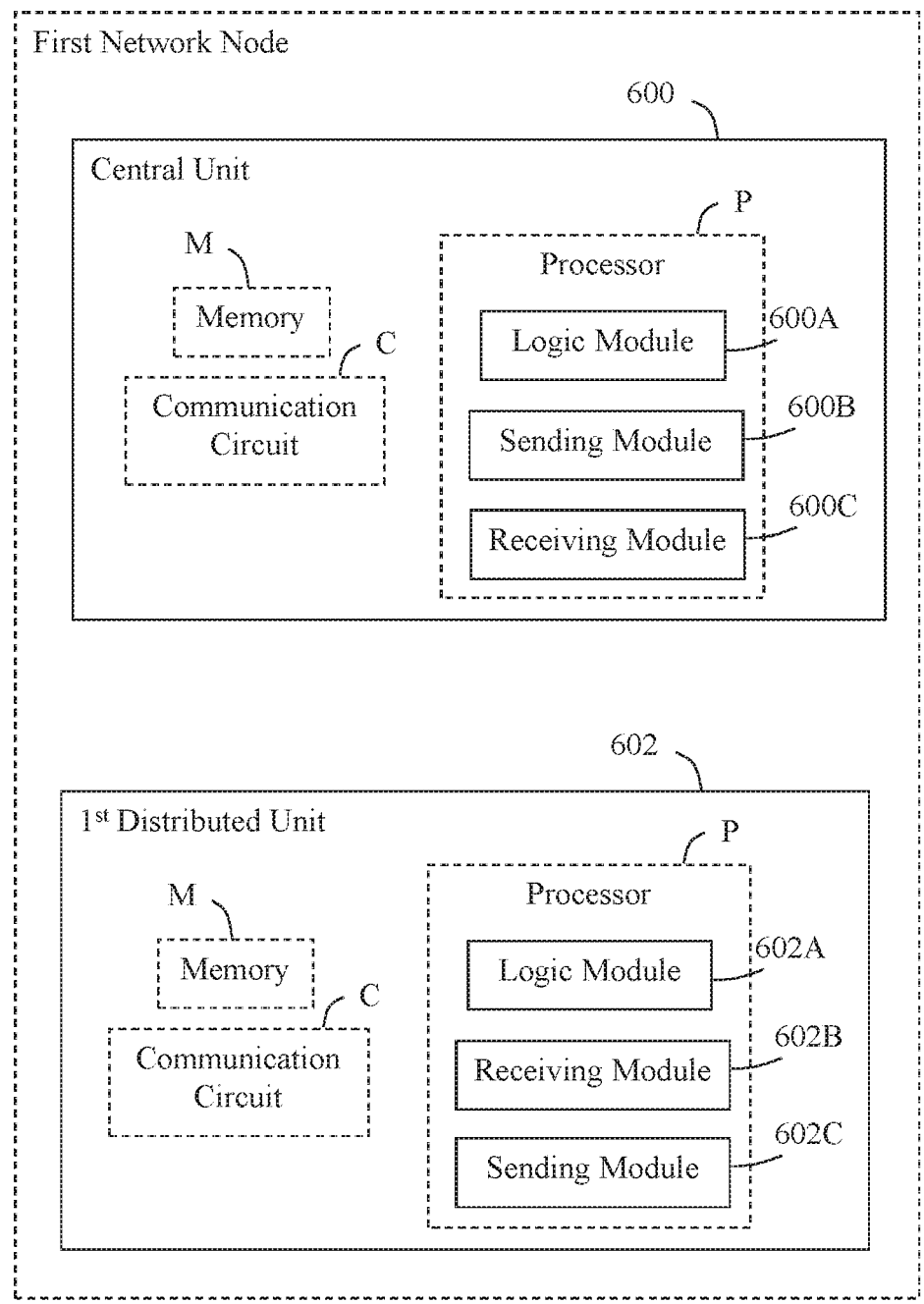
FIG. 6 is a block diagram illustrating how a central unit and a first distributed unit of a first network node may be configured, according to further possible embodiments.

The block diagram in FIG. 6 illustrates a detailed but non-limiting example of how a central unit 600 and a first distributed unit 602, respectively, of a first network node may be structured to bring about the above-described solution and embodiments thereof. In this figure, the central unit 600 and the first distributed unit 602 may be configured to operate according to any of the examples and embodiments of employing the solution as described herein, where appropriate. Each of the central unit 600 and the first distributed unit 602 is shown to comprise a processor "P", a memory "M" and a communication circuit "C" with suitable equipment for sending and receiving messages in the manner described herein.

The communication circuit C in each of the central unit 600 and the first distributed unit 602 thus comprises equipment configured for communication using suitable protocols for the communication depending on the implementation. The solution is however not limited to any specific types of messages or protocols.

The central unit 600 is, e.g. by means of units, modules or the like, configured or arranged to perform at least some of the actions of the flow chart in FIG. 4A and as follows. Further, the first distributed unit 602 is, e.g. by means of units, modules or the like, configured or arranged to perform at least some of the actions of the flow chart in FIG. 4B and as follows.

The central unit 600 is arranged to handle a communication with a wireless device in a wireless network. The first network node comprises the central unit 600 which can be connected to a core part of the wireless network and at least a first distributed unit 602 which can be used for radio communication with the wireless device.

The central unit 600 is configured to send an indication to the first distributed unit 602 to indicate whether a current procedure for the wireless device is an inter-central unit procedure or an intra-central unit procedure, said current procedure being related to mobility or multi-connectivity of the wireless device. This operation may be performed by a sending module 600B in the central unit 600, as illustrated in action 402. The sending module 600B could alternatively be named a transmitting or messaging module.

The central unit 600 may also comprise a logic module 600A operable or configured to perform various logic operations, such as processing and configuring messages as described herein. The central unit 600 may further comprise a receiving module 600C operable or configured to receive messages as described herein.

The first distributed unit 602 is arranged to handle a communication with a wireless device in a wireless network, wherein the first network node comprises a central unit 600 which can be connected to a core part of the wireless network and at least the first distributed unit which can be used for radio communication with the wireless device.

The first distributed unit 602 is configured to receive an indication from the central unit 600, the indication indicating whether a current procedure for the wireless device is an inter-central unit procedure or an intra-central unit procedure, said current procedure being related to mobility or multi-connectivity of the wireless device. This operation may be performed by a receiving module 602B in the first distributed unit 602 as illustrated in action 404.

The first distributed unit 602 may also comprise a logic module 602A operable or configured to decide whether to send information about the communication with the wireless device to the central unit via a user plane or via a control plane based on the indication from the central unit, as illustrated in action 406. The first distributed unit 602 may further comprise a sending module 602C operable or configured to send messages as described herein.

It should be noted that FIG. 6 illustrates various functional modules in the central unit 600 and the first distributed unit 602, respectively, and the skilled person is able to implement these functional modules in practice using suitable software and hardware equipment. Thus, the solution is generally not limited to the shown structures of the central unit 600 and the first distributed unit 602, and the functional modules therein may be configured to operate according to any of the features, examples and embodiments described in this disclosure, where appropriate.

The functional modules 600A-C and 602A-C described above may be implemented in the central unit 600 and the first distributed unit 602, respectively, by means of program modules of a respective computer program comprising code means which, when run by the processor P causes the central unit 600 and the first distributed unit 602 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the central unit 600 and the first distributed unit 602 in the form of a memory having a computer readable medium and being connected to the processor P. The computer program product or memory M in each of the central unit 600 and the first distributed unit 602 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective central unit 600 and first distributed unit 602.

The solution described herein may be implemented in each of the central unit 600 and the first distributed unit 602 by a computer program comprising instructions which, when executed on at least one processor, cause the at least one processor to carry out the actions according to any of the above embodiments and examples, where appropriate. The solution may also be implemented at each of the central unit 600 and the first distributed unit 602 in a carrier containing the above computer program, wherein the carrier is one of an electronic signal, optical signal, radio signal, or computer readable storage medium.

Some further examples and features of how the solution may be employed will now be described. In the following, the terms UE, gNB-CU and gNB-DU are used to represent the above-described wireless device, central unit and distributed unit, respectively.

The embodiments and examples herein provide a mechanism that allows the gNB-CU to notify a gNB-DU whether an ongoing procedure is either inter or intra gNB-CU. This allows for example the gNB-DU to decide whether to send the notification about successfully transmitted PDCP Packet Data Units (PDUs) using the control plane F1-C interface (for inter gNB-CU procedures) or the user plane F1-U interface (for intra gNB-CU procedures). This may improve performance as it allows to reduce the signalling. It can also reduce the latency of handover and MN/SN change procedures thanks to the reduced signalling.

The gNB-CU can for example include the indication on whether the procedure is intra or inter gNB-CU in any of the following messages:

In the UE Context Modification Request and/or UE Context Release Command message. It can be for example a new IE or included in an existing IE (e.g., a flag in an existing IE);

In the F1 DL RRC Message Transfer message. It can be for example a new IE or included in an existing IE (e.g., a flag in an existing IE);

In the Bearer Modification Request and/or Bearer Release message. It can be for example a new IE or included in an existing IE (e.g., a flag in an existing IE);

In a new F1AP message.

As mentioned above, mobility and handover is used herein as a non-limiting example of the procedure to describe the applicability and the benefits of the proposed mechanism. However, the solution can be used also in the case of multi-connectivity, i.e., scenarios where the UE has multiple radio links served potentially by different DUs and gNBs and additions/release/modification of extra radio legs are performed. In the following, an example of the proposed solution and its benefits is presented.

To further explain the solution and its advantages some practical examples are presented in the following. In these examples, the handover procedure is considered in case of both intra gNB-CU handover and inter gNB-CU handover, as outlined below. It is also assumed that the gNB-CU comprises a control plane part CU-CP and a user plane part CU-UP (which is supported by the 3GPP standard).

Intra gNB-CU handover: in this case the source gNB-DU (S-DU) and target gNB-DU (T-DU) are within the same gNB-CU (CU-CP and CU-UP) 700 and only one central unit is therefore involved in this procedure. After being informed about the handover, the S-DU should send information about the latest and most recently transmitted PDCP PDUs to the gNB-CU (CU-UP). There are two possible alternative ways which are illustrated in FIG. 7 with full and dashed arrows, respectively:

1. User plane: Using Downlink Data Delivery Status (DDDS) over the F1-U. This alternative is illustrated by full arrows in the figure. In this case, the S-DU can inform directly the CU-UP about the DDDS and transmission toward the target T-DU can start immediately afterwards.
2. Control Diane: Using SN Status Transfer over F1-C and E1. This alternative is illustrated by dashed arrows in the figure. It requires the transmission of two control plane messages (one over F1-C and one over E1) before the CU-UP can start re-transmitting the PDCP PDUs that were not delivered by the S-DU.

In this case of intra gNB-CU handover, the user plane alternative may thus be deemed more efficient.

Inter gNB-CU handover in this case the handover is between different gNBs 800 and 802 and two central units are therefore involved in this procedure, including a central unit in a source gNB 800 and a central unit, not shown, in a target gNB 802. After being informed about the handover, the S-DU should send information about the latest and most recently transmitted PDCP PDUs to the source gNB-CU which then needs to forward this information to the target gNB (T-gNB) 802 over the Xn interface using Xn Status Transfer. There are two alternative ways which are illustrated in FIG. 8:

1. User Diane: S-DU in the source gNB 800 sends Downlink Data Delivery Status (DDDS) over the F1-U to CU-UP. After, CU-UP sends a E1 SN Status Transfer to S-CU-CP. Finally, S-CU-CP sends the Xn Status Transfer to the target gNB (T-gNB) 802. This alternative is illustrated by full arrows in the figure.
2. Control plane: S-DU sends the F1 SN Status Transfer directly to S-CU-CP. Then, S-CU-CP can directly send the Xn Status Transfer to the T-gNB 802. This alternative is illustrated by a dashed arrow in the figure.

In this case of inter gNB-CU handover, the control plane method may be deemed more efficient.

Based on the discussion above, the most efficient approach may be that the S-DU sends the information about the latest and most recently transmitted PDCP PDUs using user plane (F1-U) for intra gNB-CU handover and using control plane (F1-C) for inter gNB-CU handover. However, this is not possible according to the current standard since the S-DU cannot deduce whether the handover is an intra gNB-CU procedure or an inter gNB-CU procedure. The embodiments herein allow the S-DU to know whether an ongoing procedure is intra gNB-CU or inter gNB-CU. Therefore, the gNB-DU can optimize the signalling by sending the information about the latest and most recently transmitted PDCP PDUs (i) over F1-U for intra gNB-CU handover (ii) and over F1-C for inter gNB-CU handover.

The embodiments herein thus allow the gNB-CU to inform gNB-DU whether the gNB-CU would change or not, in cases of mobility and multi-connectivity, and subsequently the gNB-DU is able to decide which method—either control or user plane—to use to indicate e.g. which packets are successfully transmitted.

Some examples of how existing signalling flows may be modified so that the solution can be used in the case intra gNB-CU and inter gNB-CU mobility, respectively, will now be described with reference to FIGS. 9 and 10.

Example 1A: Intra NR and Intra gNB-CU Mobility

Figure 9:
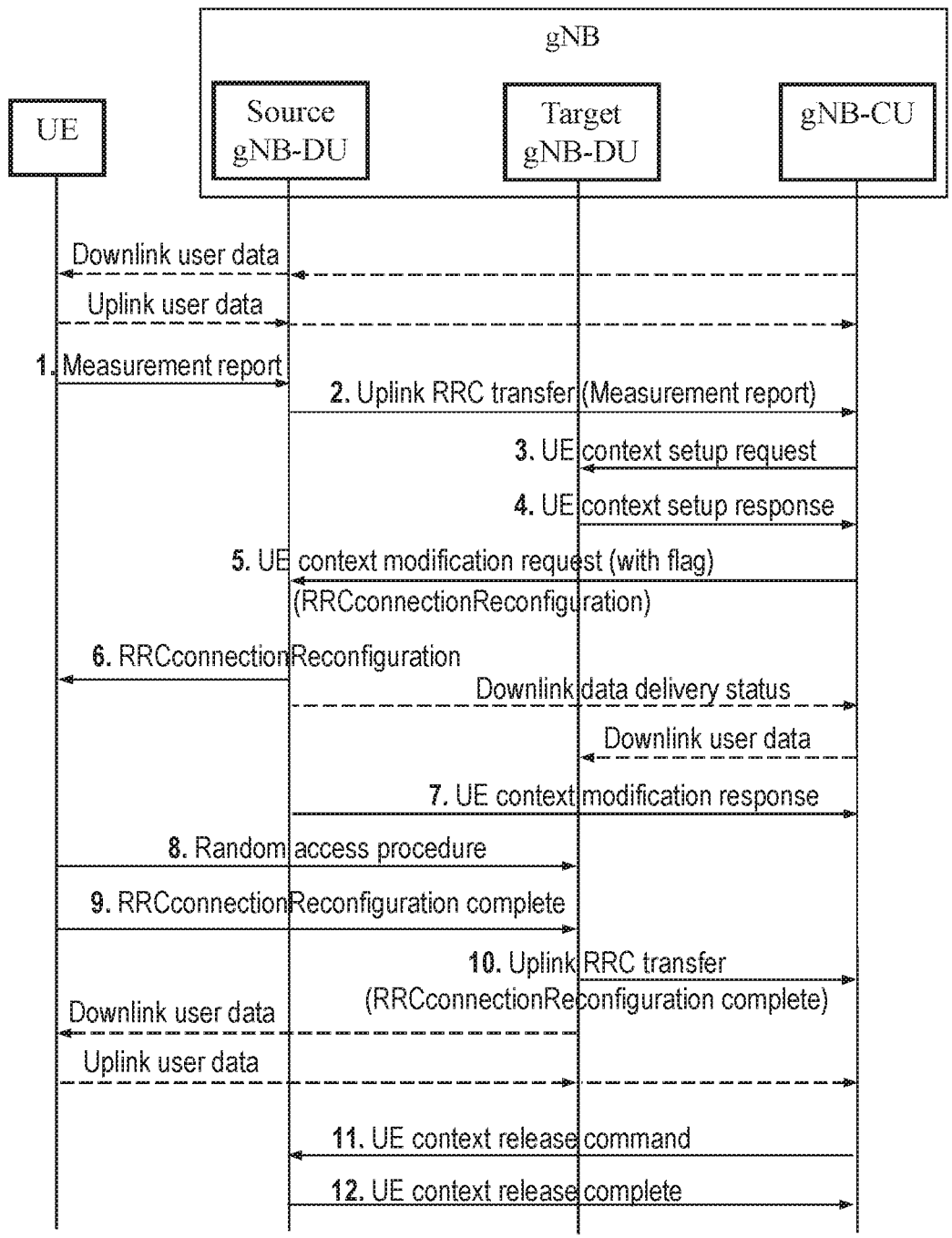
FIG. 9 is a signalling diagram illustrating an example of a procedure when the solution is used, according to further possible embodiments.
Figure 10:
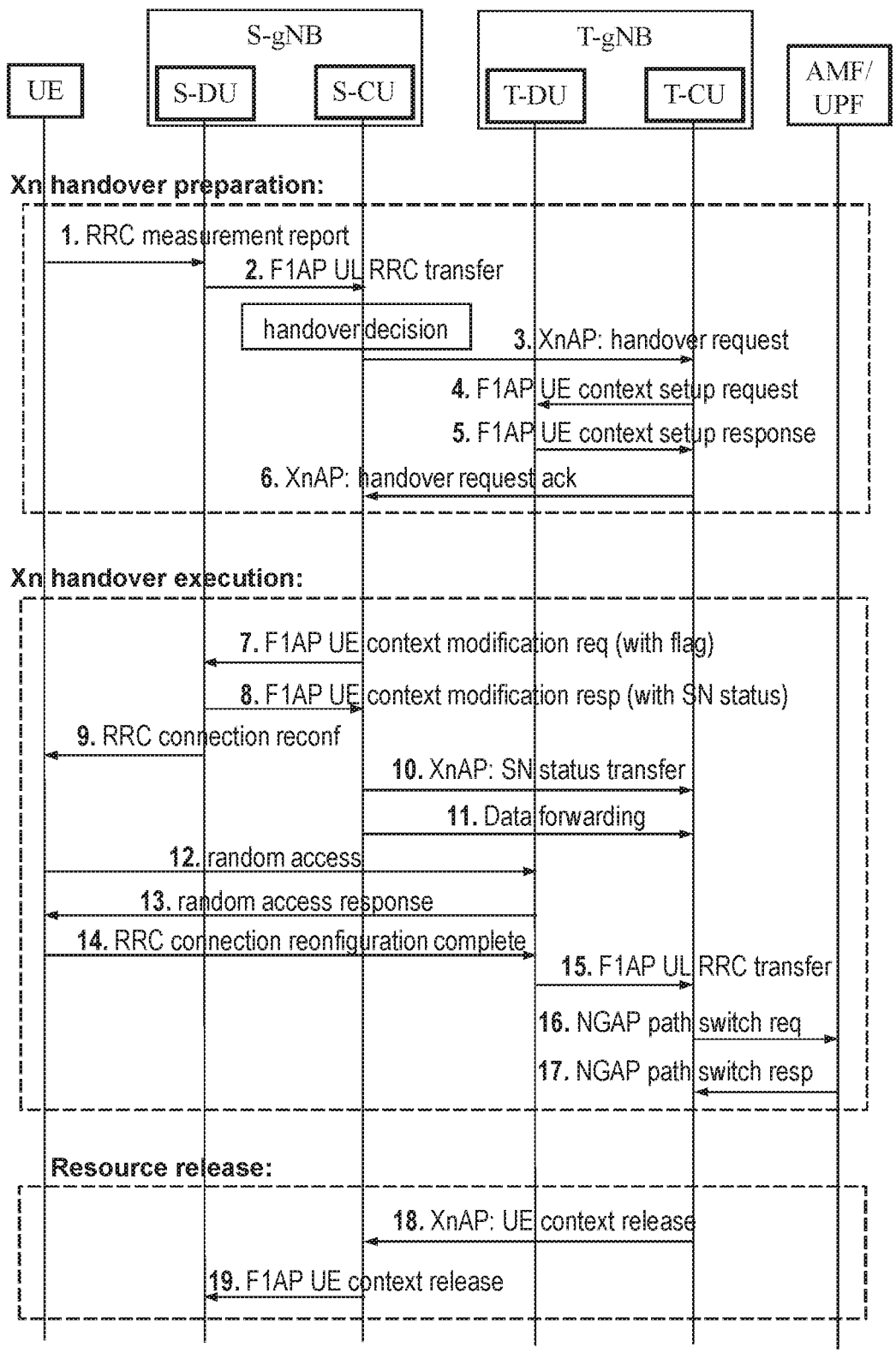
FIG. 10 is a signalling diagram illustrating another example of a procedure when the solution is used, according to further possible embodiments.

For this example, a signalling process in the case of intra gNB-CU mobility is depicted in FIG. 9. This signalling process can be used for the case when the UE moves (is handed over) from one gNB-DU to another gNB-DU within the same gNB-CU during NR operation, corresponding to the above-described case of intra gNB-CU handover.

This figure illustrates a sequence of signalling steps 1-12 where a flag is used in signalling step 5 to denote to the gNB-DU that it is an intra gNB-CU handover. In this example, the gNB-CU includes this flag in the UE Context Modification Request toward the source gNB-DU (step 5). However, the flag could also be replaced by a newly specified message, or the flag could added to any other opportune message. Based on the received flag, the source gNB-DU is informed that the handover is within the same gNB-CU. The source gNB-DU can therefore choose to use one of the two alternatives outlined above for the Intra gNB-CU handover case, i.e. either via the UP or via the CP.

In FIG. 9, the signalling using the UP interface is shown as this signalling results in less number of messages and faster information exchange, as compared to using the CP interface. The figure shows a user plane notification over F1-U, e.g., the Downlink Delivery Status Report (DDDS) after step 6, to inform the gNB-CU about the unsuccessfully transmitted downlink data to the UE. Downlink packets, which may include PDCP PDUs not successfully transmitted in the source gNB-DU, are sent from the gNB-CU to the target gNB-DU immediately afterwards. This makes the handover more efficient as transmission in the target can start very quickly.

NOTE: in this example, it is not shown that CU can be split in CU-CP and CU-UP in which case the advantage of the propose solution would be even more significant.

In another example, the gNB-CU does not need to wait until reception of the Downlink Data Delivery Status in order to start forwarding Downlink User Data to the target gNB-DU. In fact, the gNB-CU may stop sending PDCP PDUs to the Source gNB-DU as soon as a UE Context Modification Request is sent by the gNB-CU (message in step 5). At this point, the gNB-CU may start sending PDCP PDUs (downlink user data) to the target gNB-DU. When the gNB-CU receives a Downlink Data Delivery Status, indicating which PDCP PDUs have not been delivered in the source gNB-DU, the gNB-CU may deliver those PDCP PDUs to the target gNB-DU. This would allow the target gNB-DU to always have PDCP traffic available for delivery and make PDCP traffic delivery to the target gNB-DU independent from the timing of Downlink Data Delivery Status reception.

Example 1B: Intra NR and Intra gNB-CU Mobility

In addition to what is described in Example 1A above, it is possible in the case of intra gNB-CU mobility to support inter-DU forwarding of downlink data between the source and target DUs. Sometimes an additional requirement may be that the same PDCP security key (e.g. used for encryption/decryption) used for traffic transferred to the source DU is also used for traffic transferred to the target DU.

Similar to Example 1A, the source DU will receive an indication from the CU that it is an intra gNB-CU handover. Additionally or optionally, the source DU could also receive an indication that packet forwarding should be applied. The source DU could also receive information (e.g. from the CU) on target address for the packet forward e.g. IP address of target DU, port numbers, protocols to be used, GTP TEID. The information could be valid per bearer. In case the source DU receives this information, it will forward any data or packets which has not been delivered to the UE in the source cell (e.g. served by source DU). The delivery status of the packets can be determined by acknowledgements received from the UE.

In case the source DU applies forwarding of data to the target DU, it may optionally inform the CU-UP or CU-CP about which packets have been forwarded to the target DU. The packet forwarding to the target DU can typically start from the oldest packet not confirmed by the UE.

Example 2: Xn Handover with Split Architecture

In this embodiment, an Xn handover procedure is presented, which implies that the UE changes both the gNB-DU and gNB-CU. In this case the flag or indication provided from the gNB-CU will denote to the gNB-DU that the current procedure is an inter gNB-CU handover. A signalling flow for this example in the case of inter gNB-CU mobility is depicted in FIG. 10.

In this example, the UE changes both the gNB-DU and gNB-CU in a handover procedure from a source network node S-gNB to a target network node T-gNB, corresponding to the above-described case of inter gNB-CU handover. The flag or indication sent from the source gNB-CU (S-CU) to the source gNB-DU (S-DU) will indicate that the current procedure is an inter-central unit procedure.

This figure illustrates a sequence of signalling steps 1-19 where the flag is included in the UE Context Modification Request sent from S-CU in step 7. Based on this information, the source DU can include the notification about successfully transmitted packets in a control plane message over F1-C. In this example, the source DU includes this information (SN status) in the UE Context Modification Response message sent to S-CU in step 8. Then the S-CU can generate an XnAP SN Status Transfer toward the target T-CU in step 10.

The examples and embodiments described herein allows the gNB-CU to inform the gNB-DU if a current procedure is an intra or inter gNB-CU procedure. Further, the gNB-DU is enabled to decide about the means to prevent data loss and inform about successfully delivered packets, specifically whether this notification about successfully transmitted packets should be carried in the user plane or in the control plane.

While the solution has been described with reference to specific exemplifying embodiments, the description is generally only intended to illustrate the inventive concept and should not be taken as limiting the scope of the solution. For example, the terms "network node", "wireless device", "central unit", "distributed unit", "control plane message", "user plane message", "inter-central unit procedure", "intra-central unit procedure" and "indication" have been used throughout this disclosure, although any other corresponding entities, functions, and/or parameters could also be used having the features and characteristics described here. The solution may be implemented according to the appended embodiments.

Further Extensions and Variations

Figure 11:
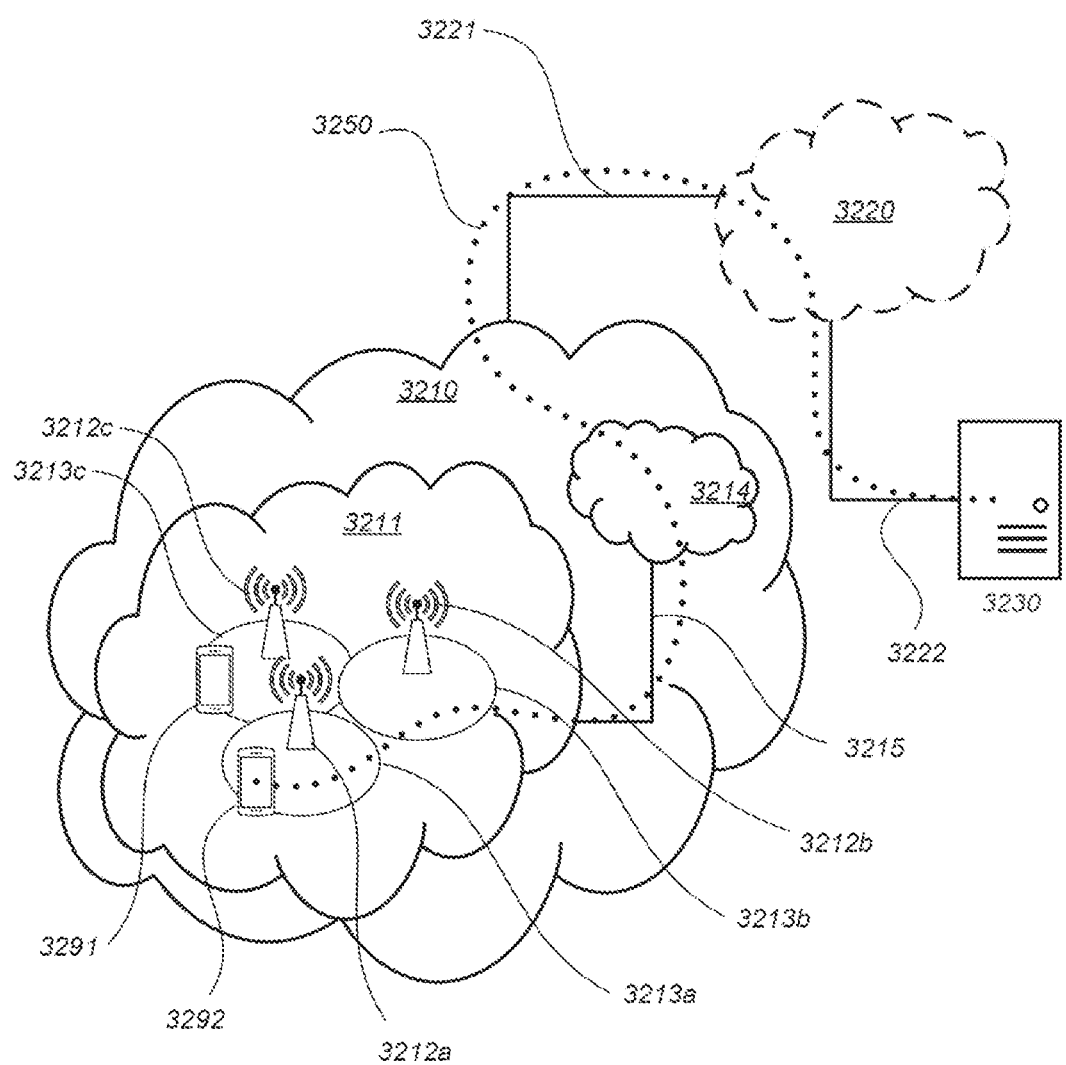

With reference to FIG. 11, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. The telecommunication network 3210 corresponds to the wireless network comprising the first and second network nodes 300, 304 as described above.

A first user equipment (UE) such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
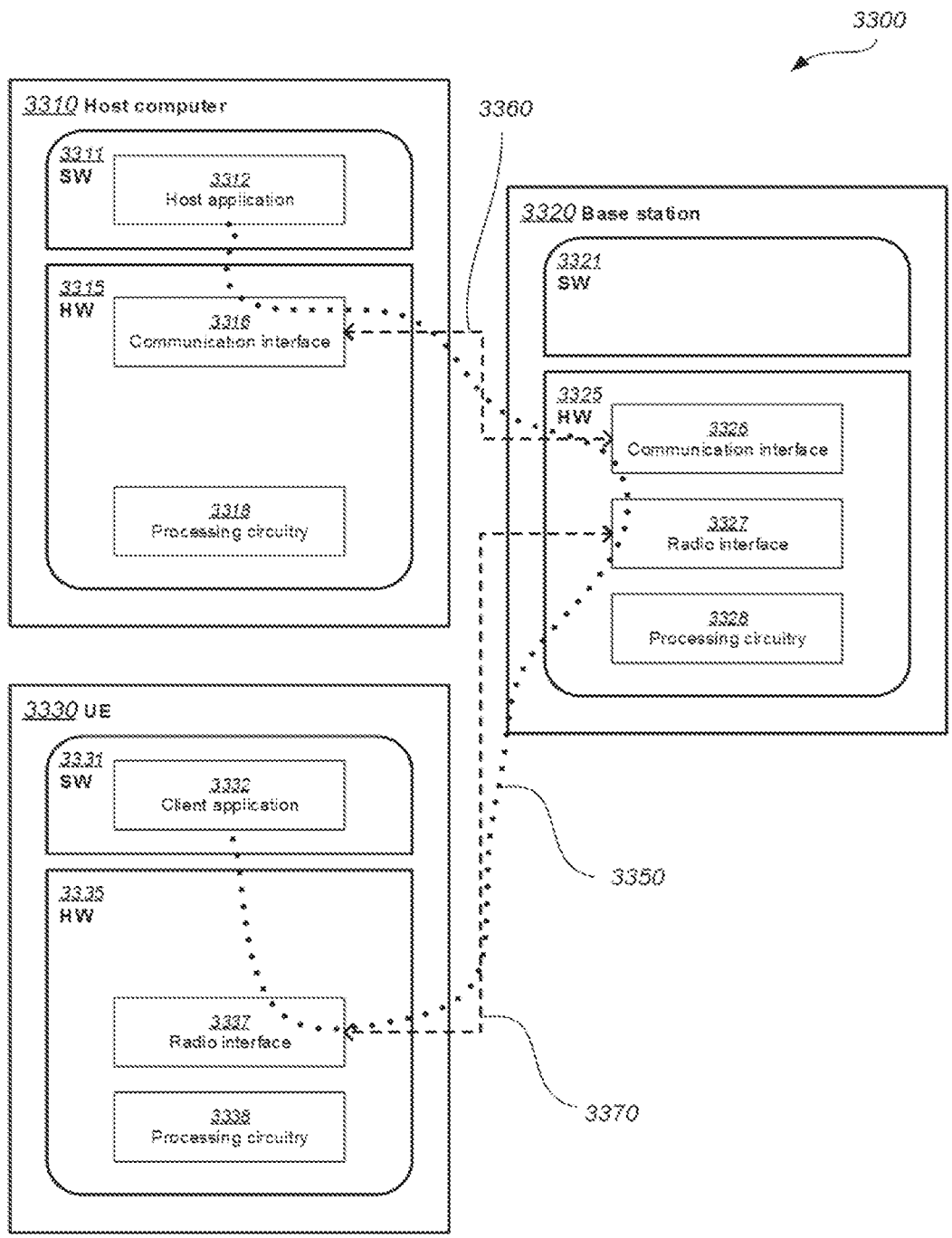

It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and reduce latency, and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

Some numbered example embodiments of the solution will now be outlined as further suggestions of how an apparatus may be configured to implement the above-described central unit and first distributed unit, respectively.

Embodiment 1

A central unit (600) of a first network node, arranged to handle a communication with a wireless device in a wireless network, wherein the first network node comprises the central unit which can be connected to a core part of the wireless network, and at least a first distributed unit (602) which can be used for radio communication with the wireless device, the central unit comprising processing circuitry configured to:
- send (600B) an indication to the first distributed unit to indicate whether a current procedure for the wireless device is an inter-central unit procedure or an intra-central unit procedure, said current procedure being related to mobility or multi-connectivity of the wireless device.

Embodiment 2

A central unit (600) according to embodiment 1, wherein the central unit is operable to send the indication in a message being any of: a UE Context Modification Request, a UE Context Release Command message, an F1 Downlink RRC Transfer message, a Bearer Modification request, a Bearer Release message, and an F1AP message.

Embodiment 3

A central unit (600) according to embodiment 1 or 2, wherein the indication comprises a binary flag in an Information Element, IE.

Embodiment 4

A first distributed unit (602) of a first network node arranged to handle a communication with a wireless device in a wireless network, wherein the first network node comprises a central unit (600) which can be connected to a core part of the wireless network and at least the first distributed unit which can be used for radio communication with the wireless device, the first distributed unit comprising processing circuitry configured to:
- receive (602B) an indication from the central unit, the indication indicating whether a current procedure for the wireless device is an inter-central unit procedure or an intra-central unit procedure, said current procedure being related to mobility or multi-connectivity of the wireless device.

Embodiment 5

A first distributed unit (602) according to embodiment 4, wherein the first distributed unit (602) is operable to receive the indication in a message being any of: a UE Context Modification Request, a UE Context Release Command message, an F1 Downlink RRC Transfer message, a Bearer Modification request, a Bearer Release message, and an F1AP message.

Embodiment 6

A first distributed unit (602) according to embodiment 4 or 5, wherein the indication comprises a binary flag in an Information Element, IE.

Embodiment 7

A first distributed unit (602) according to any of embodiments 4-6, wherein the first distributed unit is operable to decide whether to send information about the communication with the wireless device to the central unit via a user plane or via a control plane based on the indication from the central unit.

Embodiment 8

A first distributed unit (602) according to any of embodiments 4-7, wherein when the current procedure is related to mobility of the wireless device, the first distributed unit is operable to decide to send information about its latest transmitted data to the central unit via a user plane if the indication indicates an intra-central unit procedure and via a control plane if the indication indicates an inter-central unit procedure.

Embodiment 9

A first distributed unit (602) according to embodiment 8, wherein when the indication indicates an intra-central unit procedure, the first distributed unit is operable to send a user plane message to the central unit with information about unsuccessfully transmitted data.

Embodiment 10

A first distributed unit (602) according to embodiment 8, wherein when the indication indicates an intra-central unit procedure, the first distributed unit is operable to receive a forwarding instruction and to forward unsuccessfully transmitted data to a target second distributed unit belonging to the first network node for re-transmission to the wireless device.

Embodiment 11

A first distributed unit (602) according to embodiment 10, wherein the forwarding instruction comprises an IP address of the target second distributed unit, port numbers and protocols to be used when forwarding the unsuccessfully transmitted data to the target second distributed unit.

Embodiment 12

A first distributed unit (602) according to embodiment 8, wherein when the indication indicates an inter-central unit procedure, the first distributed unit is operable to send a control plane message to the central unit with information about successfully transmitted data.

Embodiment 13

A first distributed unit (602) according to embodiment 12, wherein the control plane message is a UE Context Modification Response message containing said information.

Embodiment 14

A first distributed unit (602) according to embodiment 13, wherein the UE Context Modification Response message sent from the first distributed unit triggers the central unit to issue an XnAP SN Status Transfer message to the target second network node.

Embodiment 15

A first distributed unit (602) according to any of embodiments 4-7, wherein when the current procedure is related to mobility of the wireless device and the indication indicates an intra-central unit procedure, the first distributed unit (S-DU) is operable to send a control plane message to a control plane part (CU-CP) of the central unit with information about latest transmitted data.

Embodiment 16

A first distributed unit (602) according to any of embodiments 4-7, wherein when the current procedure is related to mobility of the wireless device and the indication indicates an inter-central unit procedure, the first distributed unit (S-DU) is operable to send a user plane message to a user plane part (CU-UP) of the central unit with information about latest transmitted data.

Embodiment 17

A central unit (600) of a first network node, arranged to handle a communication with a wireless device in a wireless network, wherein the first network node comprises the central unit which can be connected to a core part of the wireless network, and at least a first distributed unit (602) which can be used for radio communication with the wireless device, the central unit comprising:
 a sending module (600B) configured to send an indication to the first distributed unit to indicate whether a current procedure for the wireless device is an inter-central unit procedure or an intra-central unit procedure, said current procedure being related to mobility or multi-connectivity of the wireless device.

Embodiment 18

A central unit (600) according to embodiment 17, wherein the sending module (600B) is configured to send the indication in a message being any of: a UE Context Modification Request, a UE Context Release Command message, an F1 Downlink RRC Transfer message, a Bearer Modification request, a Bearer Release message, and an F1AP message.

Embodiment 19

A central unit (600) according to embodiment 17 or 18, wherein the indication comprises a binary flag in an Information Element, IE.

Embodiment 20

A first distributed unit (602) of a first network node arranged to handle a communication with a wireless device in a wireless network, wherein the first network node comprises a central unit (600) which can be connected to a core part of the wireless network and at least the first distributed unit which can be used for radio communication with the wireless device, the first distributed unit comprising:
 a receiving module (602B) configured to receive an indication from the central unit, the indication indicating whether a current procedure for the wireless device is an inter-central unit procedure or an intra-central unit procedure, said current procedure being related to mobility or multi-connectivity of the wireless device.

Embodiment 21

A first distributed unit (602) according to embodiment 20, wherein the receiving module (602B) is configured to receive the indication in a message being any of: a UE Context Modification Request, a UE Context Release Command message, an F1 Downlink RRC Transfer message, a Bearer Modification request, a Bearer Release message, and an F1AP message.

Embodiment 22

A first distributed unit (602) according to embodiment 20 or 21, wherein the indication comprises a binary flag in an Information Element, IE.

Embodiment 23

A first distributed unit (602) according to any of embodiments 20-22, wherein the first distributed unit comprises a logic module (602A) configured to decide whether to send information about the communication with the wireless device to the central unit via a user plane or via a control plane based on the indication from the central unit.

Embodiment 24

A first distributed unit (602) according to any of embodiments 20-23, wherein when the current procedure is related to mobility of the wireless device, the first distributed unit comprises a logic module (602A) configured to decide to send information about its latest transmitted data to the central unit via a user plane if the indication indicates an intra-central unit procedure and via a control plane if the indication indicates an inter-central unit procedure.

Embodiment 25

A first distributed unit (602) according to embodiment 24, wherein when the indication indicates an intra-central unit procedure, the first distributed unit comprises a sending module (602C) configured to send a user plane message to the central unit with information about unsuccessfully transmitted data.

Embodiment 26

A first distributed unit (602) according to embodiment 24, wherein when the indication indicates an intra-central unit procedure, the receiving module (602B) is configured to receive a forwarding instruction and to forward unsuccessfully transmitted data to a target second distributed unit belonging to the first network node for re-transmission to the wireless device.

Embodiment 27

A first distributed unit (602) according to embodiment 26, wherein the forwarding instruction comprises an IP address of the target second distributed unit, port numbers and protocols to be used when forwarding the unsuccessfully transmitted data to the target second distributed unit.

Embodiment 28

A first distributed unit (602) according to embodiment 24, wherein when the indication indicates an inter-central unit procedure, the first distributed unit comprises a sending module (602C) configured to send a control plane message to the central unit with information about successfully transmitted data.

Embodiment 29

A first distributed unit (602) according to embodiment 28, wherein the control plane message is a UE Context Modification Response message containing said information.

Embodiment 30

A first distributed unit (602) according to embodiment 29, wherein the UE Context Modification Response message sent from the first distributed unit triggers the central unit to issue an XnAP SN Status Transfer message to the target second network node.

Embodiment 31

A first distributed unit (602) according to any of embodiments 20-23, wherein when the current procedure is related to mobility of the wireless device and the indication indicates an intra-central unit procedure, the first distributed unit (S-DU) is operable to send a control plane message to a control plane part (CU-CP) of the central unit with information about latest transmitted data.

Embodiment 32

A first distributed unit (602) according to any of embodiments 20-23, wherein when the current procedure is related to mobility of the wireless device and the indication indicates an inter-central unit procedure, the first distributed unit (S-DU) is operable to send a user plane message to a user plane part (CU-UP) of the central unit with information about latest transmitted data.

The invention claimed is:

1. A first distributed unit of a first network node that is configured to handle a communication with a wireless device in a wireless network, wherein the first network node comprises a central unit that is able to connect to a core part of the wireless network, and wherein the first distributed unit is configured to be used for radio communication with the wireless device, wherein the first distributed unit comprises:
    processing circuitry configured to:
        receive an indication from the central unit, the indication indicating whether a current procedure for the wireless device is an inter-central unit procedure or an intra-central unit procedure, wherein the current procedure is related to mobility or multi-connectivity of the wireless device;
        in response to a determination that the current procedure is related to mobility of the wireless device, decide to send information about its latest transmitted data to the central unit via a user plane if the indication indicates an intra-central unit procedure and via a control plane if the indication indicates an inter-central unit procedure; and
        in response to a determination that the indication indicates an intra-central unit procedure, receive a forwarding instruction and forward unsuccessfully transmitted data to a target second distributed unit belonging to the first network node for re-transmission to the wireless device.

2. The first distributed unit according to claim 1, wherein the forwarding instruction comprises an Internet Protocol (IP) address of the target second distributed unit, port numbers and protocols to be used when forwarding the unsuccessfully transmitted data to the target second distributed unit.

3. A first distributed unit of a first network node that is configured to handle a communication with a wireless device in a wireless network, wherein the first network node comprises a central unit that is able to connect to a core part of the wireless network, and wherein the first distributed unit is configured to be used for radio communication with the wireless device, wherein the first distributed unit comprises:
    processing circuitry configured to:
        receive an indication from the central unit, the indication indicating whether a current procedure for the wireless device is an inter-central unit procedure or an intra-central unit procedure, wherein the current procedure is related to mobility or multi-connectivity of the wireless device;
        in response to a determination that the current procedure is related to mobility of the wireless device, decide to send information about its latest transmitted data to the central unit via a user plane if the indication indicates an intra-central unit procedure and via a control plane if the indication indicates an inter-central unit procedure; and
        in response to a determination that the indication indicates an inter-central unit procedure, send a control plane message to the central unit with information about successfully transmitted data.

4. The first distributed unit according to claim 3, wherein the control plane message is a user equipment (UE) Context Modification Response message containing the information.

5. The first distributed unit according to claim 4, wherein the UE Context Modification Response message sent from the first distributed unit triggers the central unit to issue an XnAP SN Status Transfer message to the target second network node.

* * * * *